US012674118B2

(12) United States Patent
Naqvi

(10) Patent No.: US 12,674,118 B2
(45) Date of Patent: Jul. 7, 2026

(54) STABLE ANHYDROUS DISH SOAP AND METHOD OF MAKING SAME

(71) Applicant: ONE HOME BRANDS, INC., New York, NY (US)

(72) Inventor: Syed Humza Naqvi, Walnut Creek, CA (US)

(73) Assignee: One Home Brands, Inc., New York, NY (US)

( * ) Notice: Subject to any disclaimer, the term of this patent is extended or adjusted under 35 U.S.C. 154(b) by 271 days.

(21) Appl. No.: 18/339,158

(22) Filed: Jun. 21, 2023

(65) Prior Publication Data

US 2023/0416656 A1 Dec. 28, 2023

Related U.S. Application Data

(63) Continuation-in-part of application No. 16/842,538, filed on Apr. 7, 2020, now Pat. No. 11,753,607.

(60) Provisional application No. 62/929,322, filed on Nov. 1, 2019, provisional application No. 62/836,298, filed on Apr. 19, 2019.

(51) Int. Cl.

| | |
|---|---|
| ***C11D 1/66*** | (2006.01) |
| ***C11D 1/37*** | (2006.01) |
| ***C11D 1/825*** | (2006.01) |
| ***C11D 3/00*** | (2006.01) |
| ***C11D 3/10*** | (2006.01) |
| ***C11D 3/12*** | (2006.01) |
| ***C11D 3/20*** | (2006.01) |
| ***C11D 3/22*** | (2006.01) |
| ***C11D 3/386*** | (2006.01) |
| ***C11D 3/48*** | (2006.01) |
| ***C11D 3/50*** | (2006.01) |
| ***C11D 17/00*** | (2006.01) |
| ***C11D 17/06*** | (2006.01) |

(52) U.S. Cl.

CPC .................. *C11D 3/50* (2013.01); *C11D 1/37* (2013.01); *C11D 1/662* (2013.01); *C11D 3/001* (2013.01); *C11D 3/0026* (2013.01); *C11D 3/10* (2013.01); *C11D 3/2086* (2013.01); *C11D 3/38609* (2013.01); *C11D 3/48* (2013.01); *C11D 17/0091* (2013.01); *C11D 17/06* (2013.01); *C11D 2111/14* (2024.01)

(58) Field of Classification Search

CPC .. C11D 1/66; C11D 1/825; C11D 3/10; C11D 3/12; C11D 3/2086; C11D 3/22; C11D 3/386; C11D 3/48; C11D 17/0047; C11D 17/0073; C11D 17/0091; C11D 17/06

See application file for complete search history.

(56) References Cited

U.S. PATENT DOCUMENTS

| | | | | |
|---|---|---|---|---|
| 4,925,655 | A | 5/1990 | Smigel et al. | |
| 5,691,293 | A * | 11/1997 | Kruse | C11D 1/667 510/378 |
| 5,958,334 | A | 9/1999 | Haddon | |
| 6,099,861 | A | 8/2000 | DeSenna et al. | |
| 6,713,441 | B1 * | 3/2004 | DeSenna | C11D 3/0052 422/5 |
| 9,701,931 | B2 | 7/2017 | Moore | |
| 11,359,168 | B2 * | 6/2022 | Naqvi | C11D 17/0086 |
| 11,401,488 | B2 * | 8/2022 | Naqvi | C11D 17/0073 |
| 11,753,607 | B2 * | 9/2023 | Naqvi | C11D 3/14 134/6 |
| 12,006,491 | B2 * | 6/2024 | Naqvi | C11D 3/10 |
| 2002/0068101 | A1 | 6/2002 | DeAth et al. | |
| 2007/0037729 | A1 | 2/2007 | Mathur | |
| 2009/0035228 | A1 | 2/2009 | Modak | |
| 2015/0105309 | A1 | 4/2015 | Smith et al. | |
| 2015/0111285 | A1 * | 4/2015 | Raja Abdul Rahman | A47L 15/44 510/226 |

FOREIGN PATENT DOCUMENTS

| | | | | |
|---|---|---|---|---|
| CN | 102166171 | A | 8/2011 | |
| CN | 102908271 | B | 4/2014 | |
| CN | 104818156 | A | 8/2015 | |
| CN | 107267303 | A | 10/2017 | |
| CN | 107510747 | A | 12/2017 | |
| CN | 107937146 | A | 4/2018 | |
| CN | 109810793 | A | 5/2019 | |
| DE | 10205134 | A1 | 8/2003 | |
| DE | 102014212731 | A1 | 1/2016 | |
| EP | 1090978 | A1 | 4/2001 | |
| EP | 2247705 | A2 | 11/2010 | |
| JP | H 0823039 | B2 | 3/1996 | |
| JP | 2006063099 | A | 3/2006 | |
| RU | 2038777 | C1 | 7/1997 | |
| WO | 1999/22718 | A1 | 5/1999 | |
| WO | 2009094073 | A2 | 7/2009 | |
| WO | WO 2009/094073 | * | 7/2009 | C11D 3/20 |
| WO | 2013191647 | A1 | 12/2013 | |
| WO | 2019/101813 | A1 | 5/2019 | |

(Continued)

OTHER PUBLICATIONS

Combined Search and Examination Report issued in British Application No. GB2005275.9 on Oct. 9, 2020.
Office Action issued in German Application No. 10 2020 002 254.5 on Oct. 12, 2020, with English Translation.
Office Action issued in Canadian Patent Application No. 3,145,901 on Jul. 10, 2023.
Office Action issued in Chinese Patent Application No. 202080038542.1 on Apr. 26, 2023, w/ English Translation.
Generation Seventh 4: "Disinfecting Wipes 4-6—Lemongrass Citrus", SafetyDataSheet, Feb. 26, 2019 (Feb. 26, 2019), pp. 1-7, XP055883130, Retrieved from the Internet: URL: https://www.seventhgeneration.com/site s/default/files/2020-01/sds-fm000054-00-4-4 disinfecting-wipes-en-2019-02-26.pdf [retrieved on Jan. 24, 2022] p. 1, paragraph 3.

(Continued)

*Primary Examiner* — Brian P Mruk
(74) *Attorney, Agent, or Firm* — Herbert Smith Freehills Kramer (US) LLP

(57) ABSTRACT

The application relates to stable, anhydrous dish soap formulation.

20 Claims, No Drawings

(56) References Cited

FOREIGN PATENT DOCUMENTS

WO 2019226351 A1 11/2019

OTHER PUBLICATIONS

Pérez Miriam et al: "Evaluation of low copper content antifouling paints containing natural phenolic compounds as bioactive additives", Marine Environmental Research, vol. 109, Aug. 1, 2015 (Aug. 1, 2015), pp. 177-184, XP055883122, GB ISSN: 0141-1136, DOI: 10.1016/j.marenvres.2015.07.006; p. 181; table 3.
EPO—Extended European Search Report issued in corresponding EP Application No. 21205569.3, dated Apr. 16, 2024.
Examination Report issued in British Patent Application No. GB2314256.5 on Oct. 31, 2023.
International Search Report and Written Opinion issued in corresponding International Application No. PCT/US2020/027089, dated Jul. 17, 2020.
Frederic Pilz et al. "A welcome side effect How Velsan SC (Sorbitan Caprylate) helps to reduce the concentration of classical preservatives", Compendium on Detergency, Feb. 2, 2011, XP055711975, retrieved from the Internet: URL:http://www.teknoscienze.com/Contents/Riviste/PDF/DETERGENCY _HPC2_2011_rivista_32-34.pdf.
Office Action issued in European Patent Application No. 20722841.2 on Jun. 30, 2023.
CNIPA—Office Action issued in Chinese Patent Application No. 202080038542.1 on October 30, 2024, w/ English Translation.
Liu, Chuang, "Household Detergents." Chemical Industry Press, Jun. 30, 2001, p. 29.
Ma, Jianzhong, "Synthesis Principles and Application Technologies Of Leather Chemicals." Aug. 31, 2009, pp. 70 and 77, China.
Wang, Duoren, "Organic Food Surfactants." 30 Apr. 2009, Science & Technology Lit Press, p. 139.
CNIPA—Chinese Office Action for Chinese Application No. 202080038542.1 filed Apr. 7, 2020, mailed Dec. 12, 2023, English and Chinese translations, 22 pages.
Liu, C., "Household Detergents", Chemical Industry Press, Jun. 30, 2001, p. 29.
Jianzhong, M., "Synthesis Principles and Application Technologies of Leather Chemicals", Aug. 31, 2009, China, pp. 70 and 77.
Duoren, W., "Organic Food Surfactants", Science and Technology Literature Press, Apr. 30, 2009, p. 139.

* cited by examiner

STABLE ANHYDROUS DISH SOAP AND METHOD OF MAKING SAME

CROSS-REFERENCE TO RELATED APPLICATIONS

This application is a continuation-in-part of Ser. No. 16/842,538, filed Apr. 7, 2020, now U.S. Pat. No. 11,753,607, which claims benefit of Provisional Ser. No. 62/929,322, filed Nov. 1, 2019, which claims benefit of Provisional Ser. No. 62/836,298, filed Apr. 19, 2019.

BACKGROUND

The majority of dish soap products either for hand dish wash or dishwasher come in as a liquid in a vessel with a dispenser or packs/pods with Polyvinyl Alcohol/plastic wrapped. They also can come in as bulk as refill for liquid or packs/pods. These vessels are mostly plastic, glass, Polyvinyl Alcohol, carboard lined with plastic as water barrier. For example, the dish soap for hand wash in the market generally contains less than 40% by weight of solids relative to the weight of the dish soap. One of the problem is the packaging. Single use plastic is everywhere and it is wreaking havoc on the environment. Only 9% of all plastic is actually recycled, and packaging generates the largest portion of municipal waste (~30%). Packaged products are inefficient for businesses and the people who buy them.

Removing the water from hand dish soap formulations removes the need for single use plastic packaging and the waste that comes with it, such as packaging waste, product waste, and the waste of resources used to ship water.

Thus, a need exists for new stable formulations of hand-wash dish soap and dishwasher solid forms that meet the needs of consumers, while also reducing the amount of waste generated in their production and shipping.

SUMMARY OF THE INVENTION

The invention relates to a stable, anhydrous, and dish soap formulation in a solid form ("dish soap formulation"). The solid form includes tablet, free flowing powder, crystal/bead, granules, flake, confetti, extrusion, spray dried, and spray coated form. In some embodiments, the dish soap formulation is suitable for hand washed dishes and can be placed in an unrigid wrapper or non-container. In some embodiments, the dish soap formulation is suitable for a dishwasher.

In one aspect of the invention, a dish soap formulation is provided. The dish soap formulation comprises a surfactant and a filler, wherein more than 40% by weight of the dish soap formulation are solids and wherein the dish soap formulation is substantially fatty acid free.

In another aspect, a method of making the dish soap formulation is provided.

In another aspect, a method of how to use the dish soap formulation is provided.

DETAILED DESCRIPTION OF THE INVENTION

This disclosure relates to a stable anhydrous dish soap formulation in a solid form ("dish soap formulation"). The dish soap formulation contains more than 40% by weight of solids and is both good for the environment and effective for cleaning dishes. The advantages of the dish soap formulation over the traditional liquid dish soap include chemical stability, reduced packaging, and convenience for the consumer. The dish soap formulation described herein can outperform leading liquid dish soap on burnt on cheese and heavy burnt on paste sauce.

As used in this specification, the singular forms "a," "an," and "the" include plural referents unless the context clearly dictates otherwise. Thus, for example, reference to a "surfactant" includes a single kind of surfactant or two or more different kinds of surfactants.

The term "anhydrous" as used herein refers to a dish soap formulation comprising less than about 5% by weight of water based on the weight of the dish soap.

The term "substantially fatty acid-free" as used herein refers to a stable, anhydrous dish soap formulation comprising less than 10%, 9%, 8%, 7%, 6%, 5%, 4%, 3%, 2%, or 1% by weight of a fatty acid, including animal fats (such as tallow) and vegetable oil (such as coconut-oil and palm oil) or salt thereof based on the weight of the dish soap formulation.

The term "anionic surfactant free", "alginate free", "alcohol free", "glycol free", "glycerol free", "sodium sulfate free", and "polyvinyl alcohol free" as used herein refers to a dish soap formulation comprising less than 10%, 9%, 8%, 7%, 6%, 5%, 4%, 3%, 2%, or 1% by weight of anionic surfactant, alginate, alcohol, glycol, glycerol, sodium sulfate, and polyvinyl alcohol, respectively, based on the weight of the dish soap formulation.

The term "comprising" includes the embodiments of "consisting of" or "consisting essentially of."

In one aspect, a stable anhydrous dish soap formulation in a solid form is provided. The dish soap formulation comprises a surfactant and a filler, wherein the dish soap formulation comprises more than 40% by weight of solids and is substantially fatty acid free. The filler can be present in an amount that is to fill up the percentage of the dish soap to one hundred percent.

In some embodiments, the solid form is a free flowing powder, crystal/bead, granules, flake, confetti, extrusion, spray dried, or spray coated foam. The solid form can be effervescent.

In each of the preceding aspect and embodiments, the dish soap can be in a free flowing powder form.

In each of the preceding aspect and embodiments, the dish soap formulation can be suitable for washing dishes by hand.

In each of the preceding aspect and embodiments, the surfactant can be an anionic, nonionic, amphoteric, zwitterionic, or cationic surfactant.

In each of the preceding aspect and embodiments, the dish soap formulation comprises one, two, or more surfactants. In each of the preceding aspect and embodiments, the dish soap formulation comprises two or more surfactants such as anionic-surfactants.

In each of the preceding aspect and embodiments, the surfactant is not naturally occurring.

In each of the preceding aspect and embodiments, the filler can be selected from sodium bicarbonate, sodium gluconate, sodium sulfate, pumice stone sodium carbonate, any other alkali carbonates and bicarbinates, calcium carbonate, magnesium carbonate, starch, sugar alcohols (e.g., sorbitol), dextrose, dextrin, inulin, sodium silicate, polyethylene glycol, PVP, PVA, pullulan, cellulose, salts, and gums.

In each of the preceding aspect and embodiments, the filler can be sodium bicarbonate and/or sodium carbonate. In some embodiments, the amount of sodium carbonate or sodium bicarbonate can range from 30% to 96% based on the total weight of the formulation.

In each of the preceding aspect and embodiments, the dish soap formulation can further comprise a preservative such as sodium/potassium benzoate, sodium/potassium sorbate, caprylic acid, combination of Sodium/potassium acetate with sodium percarbonate as disinfectant), sorbitan caprylate, phenoxyethanol, ethylhexylglycerin, methylisothiazolinone, and, benzisothiazolinone.

In each of the preceding aspect and embodiments, the dish soap formulation can comprise more than 45 wt %, 50 wt %, 55 wt %, 60 wt %, 65% wt %, 70 wt %, 75 wt %, 80 wt %, 85 wt %, 90 wt %, or 95 wt % of solids.

In each of the preceding aspect and embodiments, the dish soap formulation can comprise 50 wt %, 55% wt %, 60 wt %, 65% wt %, 70 wt %, 75 wt %, 80 wt %, 85 wt %, 90 wt %, 95 wt %, 96 wt %, 97 wt %, 98 wt %, 99 wt %, or 100 wt % solids.

In each of the preceding aspect and embodiments, the dish soap formulation can further comprise a liquid ingredient carrier or flow aid.

In each of the preceding aspect and embodiments, the dish soap formulation can further comprise a water softener.

In each of the preceding aspect and embodiments, the dish soap formulation can optionally further comprise a foam stabilizer.

In each of the preceding aspect and embodiments, the dish soap formulation can further comprise a fragrance. The amount of fragrance may range from about 0% to about 5.0% by weight based on the weight of the dish soap.

In each of the preceding aspect and embodiments, the dish soap formulation can further comprise an enzyme, probiotics, dish drying agent, powder drying agent, foaming agent (for hand dish), anti-foaming agent (for dish washer), or essential oil. In some embodiments, the drying agent can be hydrated silica that can also work as a process aid. In some embodiments, the drying agent can be sodium silicate or calcium silicate that can also work as a process aid. The amount of drying agent may range from about 0% to about 2.0% by weight based on the weight of the dish soap.

In each of the preceding aspect and embodiments, the dish soap formulation can comprise a surfactant, a filler, a flow aid, and a water softener, wherein the dish soap formulation comprises more than 40% by weight of solids and is substantially fatty acid free. In some embodiments, this dish soap formulation is suitable for hand wash. In some embodiments, the dish soap formulation for hand wash is in the form of a powder.

In each of the preceding aspects and embodiments, the dish soap formulation is alcohol free, glycol free, glycerol free, sodium sulfate free, and/or polyvinyl alcohol free.

In each of preceding aspect and embodiments, the dish soap formulation can comprise a non-ionic surfactant, a filler, a water softener, and an enzyme, and the formulation is further anionic surfactant free and/or alginate free.

In some embodiments, this dish soap formulation is suitable for dish washer. In some embodiments, the dish soap formulation for dish washer is in the form of a tablet. In some embodiments, the dish soap formulation for dish washer can further comprise a mild cleaner that can boost antibacterial activity such as sorbitan caprylate. In some embodiments, the filler in the dish soap formulation for dish washer comprises sodium carbonate which is present in an amount of 30-96 wt % based on the total weight of the formulation.

In some embodiments, the dish soap formulation for dish washer can further comprise an anti-filming agent such as sodium carboxymethyl Inulin. In certain embodiments, the amount of the anti-filming agent may range from 0% to 7%. In certain further embodiments, the amount of the anti-filming agent may range from 2% to 4%.

The amount of the surfactant in the tablet may range from 0% to 7%, 0% to 8%, 0% to 15%, 1% to 10%, 1% to 15%, 1% to 20%, 1% to 25%, 1% to 30%, 1% to 35%, 1% to 40%, 1% to 45%, 1% to 50%, 1% to 55%, 1% to 60%, from 1% to 4%, from 2% to 25%, from 2% to 10%, from 5%-15%, from 5% to 55%, or from 10% to 45, by weight, based on the weight of the dish soap. The surfactant can be natural or synthetic surfactants, such an anionic, nonionic excluding poloxamer, amphoteric, zwitterionic, or cationic surfactants, such as anionic and non-ionic surfactants, further such as a surfactant selected from sodium coco sulfate, sodium methyl oleoyl taurate, ethoxylated alcohols (such as ethoxylated alcohols C(10-12)-C(14-16) with 4-8 moles ethoxylation (EO), for example, Clariant Genapol LA 060 (ethoxylated alcohol C(12-16)) with 6 moles ethoxylation), ethoxylated alcohols C(8-10) with 6-8 moles of ethoxylation, etc.), sodium lauryl sulfate, alkyl polyglucosides (such as lauryl glucoside, caprylyl/myristyl glucoside, caprylyl/decyl glucoside), sodium methyl oleyl taurate, sodium lauryl sarcosinate, sodium lauroyl sarcosinate, sodium cocoyl glutamate, sodium lauroyl glutamate, sodium cocoyl isethionate, cocamidopropyl hydroxysultaine, cocamidopropyl betaine, lauramine oxide, and alpha-olefin sulfonates. When the dish soap is for hand wash, the dish soap formulation disclosed herein contains significantly more anionic surfactant than non-ionic surfactant. In some embodiments, no non-ionic surfactant is contained in a dish soap for hand wash. In some embodiments, non-ionic surfactant is present in an amount of less than 1.0 wt % in a dish soap for hand wash. When the dish soap is for a dish washer, the dish soap formulation disclosed herein contains non-ionic significantly more non-ionic surfactant than anionic-surfactant. In some embodiments, the dish soap formulation disclosed herein for a dish washer contains no anionic-surfactant.

The amount of the liquid ingredient carrier/flow aid in the dish soap may range from 0.1% to 5%, such as from about 0.1% to about 3%, further such as from about 0.3% to about 1% by weight, based on the weight of the dish soap. The liquid ingredient carrier/flow aid can be selected from hydrated silica. Evonik's sipernat series and PPQ Hydared silica series are suitable carrier/flow aid.

The amount of the water softener may range from 2% to 8%, 0% to 30%, 0 to 40%, 0% to 60%, 1% to 35%, 15% to 25%, 5% to 15%, 25% to 35%, 5% to 30%, or 10% to 25% by weight based on the weight of the dish soap. Exemplary water softener includes citric acid or a salt thereof (such as sodium citrate), ethylenediaminetetraacetic acid (EDTA), sodium gluconate, methylglycinediacetic acid trisodium salt, and tetrasodium Glutamate Diacetate.

The amount of the foam stabilizer in the hand dish soap may range from 0% to 5% by weight based on the weight of the dish soap. Exemplary foam stabilizer can be selected from carboxymethyl cellulose (CMC) or a salt thereof (such as sodium CMC). In some embodiments, no foam stabilizer is included.

The amount of enzyme in the formulation may range from 0% to 10%, such as from 0% to 4%, from 0% to 6%, from 1% to 10%, or from 3% to 7%, by weight, based on the total weight of the formulation. The enzyme can include protease (e.g., subtilisin) and amylase.

In some embodiments, the dish soap formulation may include silica as an flow aid for the formation of free-flowing powder. Free-flowing powder can be subsequently converted into tablets.

In some embodiments, the dish soap formulation does not include silica. The free-flowing powder can be formed by using solids, such as sodium carbonate, sodium sulfate, and sodium benzoate, as the initial ingredients to absorb any potential liquids that can be used in the dish soap formulation.

The amount of the filler in the dish soap is to fill up the percentage of the dish soap to one hundred percent. Exemplary filler can be selected from sodium gluconate, sodium carbonate, sodium bicarbonate, starch, sugar alcohols, dextrose, dextrin, inulin, sodium silicate, polyethylene glycol, PVP, PVA, and pullulan.

When dissolving in an appropriate amount of water, the dish soap formulation can render a pH value of 7.0-9.0.

Methods for Preparing Dish Soap Formulation

The dish soap formulation can be prepared using any suitable method. For example, the method can comprise charging the blender (e.g., Ribbon Blender, paddle blender, V-blender) with filler ingredient, spraying all liquid ingredients while mixing the filler, adding the surfactant and other ingredients, blending the resulting mixture, adding flow aid and blending until the mixture is free flowing.

When the dish soap formulation is in the form of a tablet, the tablet can be prepared using any suitable method. For example, the tablet can be prepared using direct compression or wet granulation process. For this application direct compression is most preferred. The term direct compression (or direct compaction) is used to define the process by which tablets are compressed directly from powdered mixture of ingredients into a firm compact without employing the process of wet granulation. Powder is blended homogeneously by using a blender (Ribbon Blender, V-blender, paddle blender, drum mixing). The powder blender is then charged into the hopper of tablet press. Desire weight, compression ton, & hardness of tablet are set as the tablets get compressed and come out of the tablet press. In some embodiments, the hardness is greater than 5 kpa. In some embodiments, a tablet weighs between 3.0-9.3 grams/tablet. In certain embodiments, the tablet weighs about 7.0 grams.

In some embodiments, the method comprises blending a first set of the ingredients of the dish soap formulation, adding a second set of the ingredients, and blending the first and second set of the ingredients.

In some embodiments, the method comprises blending a first set of the ingredients of the soap formulation, adding a second set of the ingredients, blending the first and second set of the ingredients, adding a flow aid, and blending the first and second set of the ingredients and the flow aid.

In some embodiments, the first set of the ingredient comprises a filler and a water softening agent, the second set of the ingredients comprise a surfactant, an enzyme, and a water softening agent.

Formats

The dish soap formulation, for example, in powder form, can be diluted in water in a powder to water ratio of greater than or equal to 1:1 (w/w), 2:1 (w/w), 3:1 (w/w), 4:1 (w/w), or 5:1 (w/w) to form a paste before shipment. A method of using the paste comprises placing the paste on surface to be cleaned either directly or through a rag or sponge, leaving overnight soak, and rinsing the surface water.

Methods of Using Stable Anhydrous Dish Soap Formulation

In one aspect, the invention includes a method of using any of the dish soap described herein including the steps of (1) wetting a sponge/rag or the dish surface with water, (2) placing the dish soap onto the sponge/rag or the dish surface, (3) scrubbing the dish surface with the sponge or let the dish soak (when the dish soap is placed on the dish surface directly), and (4) rinsing the dish with water.

For the ease of use, the dish soap in a powder form can be placed in a container that is convenient to dispense the dish soap, such as a salt shaker type, an auto dose, spout for powder or flip top.

The dish soap formulation may be stored in any suitable container, such as but not limited to plastic, glass, aluminum, ceramic, or acrylic container. The container may contain a desiccant. The container may be re-usable and refilled with ne dish soap as needed.

EXEMPLIFICATION

Materials used in the following Examples and their sources are listed below.

Example 1

A foaming hand dish soap is produced, using the following ingredients:

| Ingredients | Function | Weight (%) |
|---|---|---|
| Sodium Bicarbonate | Filler/cleaning agent | Fill to 100% |
| Hydrated silica | Liquid ingredient carrier/flow aid | <1 |
| Fragrance | Scent | 1-3 |
| Surfactant A | Cleaning agent | 1-60 |
| Surfactant B | Cleaning agent | 1-60 |
| Surfactant C | Cleaning agent | 1-60 |
| Surfactant D | Cleaning agent | 1-60 |
| Surfactant E | Cleaning agent | 1-60 |
| Sodium citrate | Water softner | 0-40 |
| Sodium CMC | Foam stabilizer | 0-5 |
| pH | 7.0-9.0 | |

Example 2

Another foaming hand dish soap is produced, using the following ingredients:

| Ingredients | Function | Weight (%) |
|---|---|---|
| Sodium Bicarbonate | Filler/cleaning agent | Fill to 100% |
| Sodium Lauryl Sulfate | Surfactant/Cleaning agent | 5-15% |
| Sodium Methyl Oleoyl Taurate | Surfactant Cleaning agent | 2-8% |
| Sodium Citrate | Water softening agent | 2-8% |
| Alky Polyglucoside Surfactants | Process Aid/Cleaning Agent | 0-1.0% |
| Hydrated silica | Liquid ingredient carrier/flow aid | <1 |

Example 3

Another foaming hand dish soap is produced, using the following ingredients:

| Ingredients | Function | Weight (%) |
|---|---|---|
| Sodium Bicarbonate | Filler/cleaning agent | Fill to 100% |
| Anionic Surfactant | Cleaning agent | 1-20% |
| Nonionic Surfactant | Cleaning agent | 1-10% |
| Sodium Citrate | Water softening agent | 2-8% |

-continued

| Ingredients | Function | Weight (%) |
|---|---|---|
| Sodium Silicate or Calcium Silicate | Drying agent/Process aid | 0-2% |
| Fragrance (Optional) | Scent | 0-5% |

Example 4

Another foaming hand dish soap is produced, using the following ingredients:

| Ingredients | Function | Weight (%) |
|---|---|---|
| Sodium Bicarbonate | Filler/cleaning agent | 85% |
| Anionic Surfactant (sodium lauryl sulfate, and/or sodium coco sulfate, and/or sodium methyl oleyl taurate) | Cleaning agent | 1-15% |
| Nonionic Surfactant (Glucosides, such as alkyl polyglucosides lauryl glucoside, caprylyl/myristyl glucoside, and/or caprylyl/decyl glucoside) | Cleaning agent | 1-10% |
| Sodium Citrate | Water softening agent | 2-8% |
| Calcium Silicate | Drying agent/Process aid | 0-2% |
| Fragrance (Optional) | Scent | 0-5% |

Example 5

Another foaming hand dish soap is produced, using the following ingredients:

| Ingredients | Function | Weight (%) |
|---|---|---|
| Sodium Bicarbonate and/or Sodium Carbonate | Filler/cleaning agent | 50-95% |
| Anionic Surfactant (Sodium Lauryl Sulfate, Sodium Coco Sulfate, Sodium Methyl Oleyl Taurate, Sodium Lauryl Sarcosinate, Sodium Lauroyl Sarcosinate, Sodium Cocoyl Glutamate, Sodium Lauroyl Glutamate, Sodium Cocoyl Isethionate, Cocamidopropyl Hydroxysultaine, Cocamidopropyl Betaine, Lauramine Oxide, and/or Alpha-Olefin Sulfonates) | Cleaning agent | 1-40% |
| Nonionic Surfactant (Glucosides, such as Alkyl Polyglucosides Lauryl Glucoside, Caprylyl/Myristyl Glucoside, Caprylyl/Decyl Glucoside, and/or Ethoxylated Alcohols, such as Ethoxylated Alcohol C(10-12)-C(14-16) with 4-8 moles of ethoxylation, e.g., Clariant Genapol LA 060, (Ethoxylated Alcohol C(12-16) with 6 moles of ethoxylation), ethoxylated alcohols C(8-10) with 6-8 moles of ethoxylation, etc.) | Cleaning agent | 1-10% |
| Sodium Citrate, Sodium Gluconate, or EDTA | Water softening agent | 2-8% |
| Hydrated Silica or Calcium Silicate | Drying agent/ Process aid | 1-8% |
| Fragrance (Optional) | Scent | 0-5% |

Example 6

A dish soap for dish washer is produced, using the following ingredients:

| Ingredients | Weight (%) | Function |
|---|---|---|
| Sodium Carbonate | 35-43 | filler/cleaning agent |
| Sodium Citrate (Dihydrate) | 17-23 | Water softening agent |
| Citric Acid Anhydrous | 8-12 | Water softening agent |
| Sodium Silicate | 3-5 | filler/pH riser/anti-corrosion inhibitor |
| Subtilisin (Protease) | 2-4 | enzymes |
| Sodium Carboxymethyl Inulin | 2-4 | Anti-filming agent |
| Sorbitan Caprylate | 2-4 | Non-streaking mild cleaner |
| Lauryl/Myristyl Glucoside | 1-4 | Non-ionic surfactant |
| Amylase | 1-3 | enzymes |
| Sorbitol | 0.5-2 | filler |
| Hydrated Silica | <1 | Flow aid |

Example 7

Another dish soap for dish washer is produced, using the following ingredients:

| Ingredients | Weight (%) | Function |
|---|---|---|
| Sodium Carbonate | 30-70 | Filler/cleaning agent |
| Citric Acid | 0-30 | Water softening agent |
| Sodium Citrate | 0-30 | Water softening agent |
| Protease, e.g., Subtilisin | 0-6 | Enzyme |
| Sodium Carboxymethyl Inulin | 0-7 | Anti-filming agent |
| Sorbitan Caprylate | 0-8 | Mild cleaner/Non-ionic surfactant |
| Glucosides, such as Alkyl Polyglucosides Lauryl Glucoside, Caprylyl/ Myristyl Glucoside, Caprylyl/Decyl Glucoside | 0-7 | Non-ionic surfactant |
| Amylase | 0-4 | Enzyme |
| Microcrystalline Cellulose | 0-15 | Filler/binding agent |
| Dextrin (hydrated) | 0-15 | Filler/binding agent |

In some embodiments the tablet weighs 3.0-9.3 g/tablet. In certain embodiments, the tablet weighs about 7.0 grams. The pH of one tablet when dissolving in appropriate amount of water is 7.0-9.0. In certain embodiments, the tablets are durable enough to ship to consumers in multi-tablet pouches comprising two or more tablets. In certain embodiments each individual tablet when in a multi-tablet pouch is durable enough that the tablet does not require individual packaging to protect the tablet and its quality anytime between production and consumption by the ultimate consumer, and thus such durability advantageously reduces the amount of packaging, reduces the amount of environmental waste/impact, and reduces the production and shipping costs.

The cleaning performance of the dish soap formulations described herein are tested using industry recognized protocols (e.g., CFT hand dish method or standard test method for deposition on glassware during mechanical dishwashing). The cleaning efficiency of the dish soap formulation described herein are either superior or satisfactory and comparable to other competitors in the market in terms of buildup of spots, film on glassware, and/or soil removal. For example, the dish washer tablets of certain embodiments are able to achieve such cleaning efficiency when the tablet weighs about 7 grams and still exhibits the durability discussed above. Without wishing to be bound to any one theory, the reduced size, retained or increased cleaning efficiency, and increased durability of certain tablets disclosed herein are in part due to the balance of ingredients in the formulations disclosed herein and the tablet formulation method discussed above.

What is claimed is:

1. A stable anhydrous dish soap formulation in a solid form, comprising a non-ionic surfactant, an enzyme, and a filler, wherein the non-ionic surfactant comprises sorbitan caprylate, wherein the dish soap formulation is in the form of a tablet, and wherein the tablet weighs from about 3.0 to less than 8.7 grams.

2. The dish soap formulation of claim 1, wherein the filler comprises sodium bicarbonate and/or sodium carbonate.

3. The dish soap formulation of claim 1, further comprising a liquid ingredient carrier or flow aid.

4. The dish soap formulation of claim 1, further comprising a water softener.

5. The dish soap formulation of claim 1, optionally further comprising probiotics, dish drying agent, powder drying agent, anti-foaming agent, or essential oil.

6. The dish soap formulation of claim 3, wherein the amount of the liquid ingredient carrier or flow aid ranges from 0.1 to 1% by weight.

7. The dish soap formulation of claim 1, which is anionic surfactant free, alginate free, alcohol free, glycol free, glycerol free, sodium sulfate free, and/or polyvinyl alcohol free.

8. The dish soap formulation of claim 1, wherein the dish soap formulation is suitable for use in a single application.

9. The dish soap formulation of claim 1, further comprising a second non-ionic surfactant, wherein the second non-ionic surfactant comprises a glucoside.

10. The dish soap formulation of claim 1, which is used in a dish washer.

11. The dish soap formulation of claim 1, wherein the non-ionic surfactant is present in an amount of 1-10 wt % based on the total weight of the formulation.

12. The dish soap formulation of claim 1, wherein the filler is present in an amount of 30-70 wt % based on the total weight of the formulation.

13. The dish soap formulation of claim 4, wherein the water softener is present in an amount of 25-35 wt % based on the total weight of the formulation.

14. The dish soap formulation of claim 1, wherein the enzyme is present in an amount of 1-10 wt % based on the total weight of the formulation.

15. The dish soap formulation of claim 1, further comprising a second non-ionic surfactant, wherein the second non-ionic surfactant comprises at least one of lauryl glucoside and/or myristyl glucoside.

16. The dish soap formulation of claim 4, wherein the water softener comprises sodium citrate and/or citric acid.

17. The dish soap formulation of claim 1, wherein the enzyme comprises a protease and/or amylase.

18. The dish soap formulation of claim 1, wherein sorbitan caprylate is a mild cleaner that can boost antibacterial activity and/or an anti-filming agent.

19. The dish soap formulation of claim 1, wherein the dish soap formulation is effervescent.

20. The dish soap formulation of claim 1, wherein the dish soap formulation comprises more than 40% by weight of solids and is substantially fatty acid free.

* * * * *